3,436,633
REGULATOR SENSING CIRCUIT FOR ALTERNATING-CURRENT GENERATOR
Stuart F. Hemmenway, Scotia, and George M. Rosenberry, Jr., Schenectady, N.Y., assignors to General Electric Company, a corporation of New York
Filed June 1, 1965, Ser. No. 460,255
Int. Cl. H02p 5/20, 7/32; H02h 7/06
U.S. Cl. 318—145        12 Claims

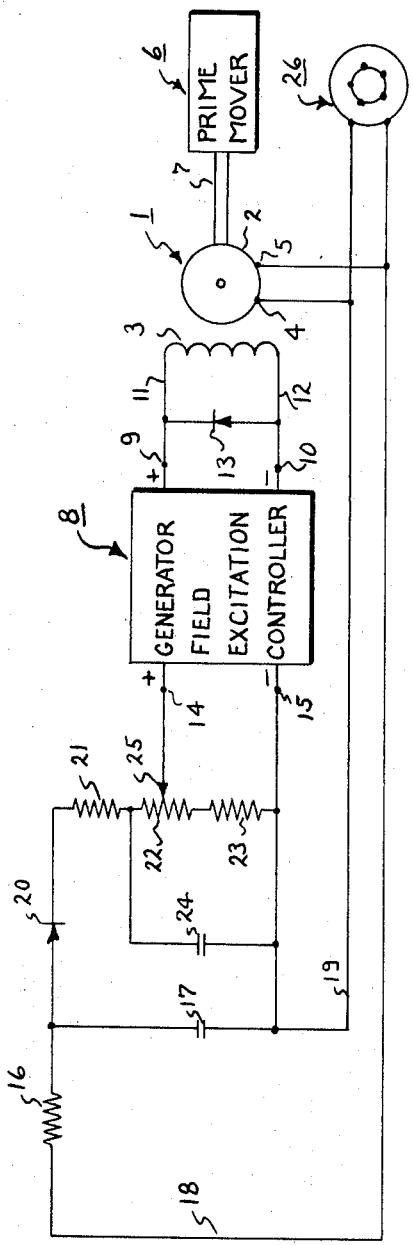
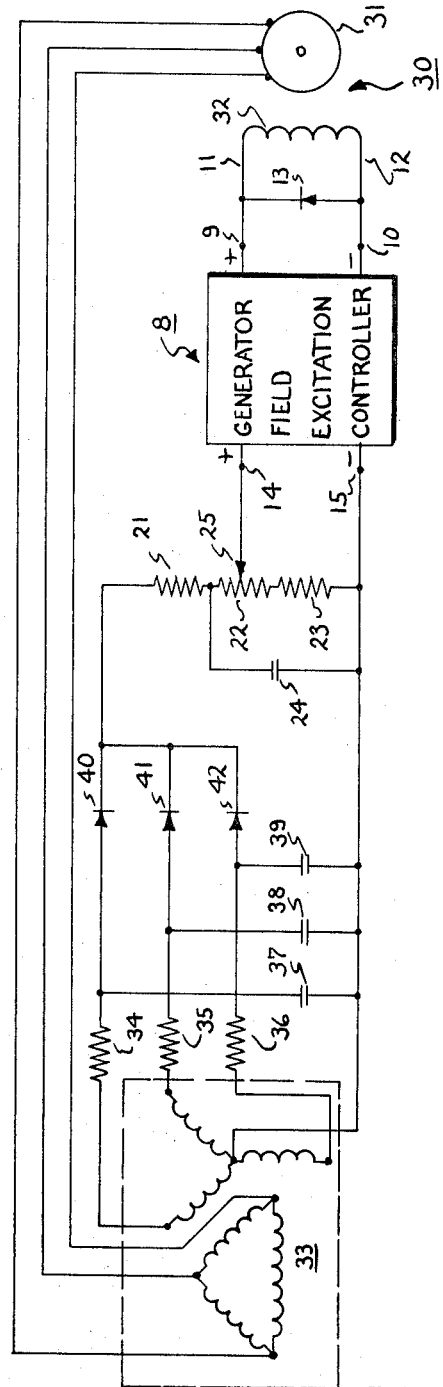
FIG. 1
FIG. 2
INVENTORS
STUART F. HEMMENWAY
GEORGE M. ROSENBERRY, JR.
BY
THEIR ATTORNEY

United States Patent Office 3,436,633
Patented Apr. 1, 1969

ABSTRACT OF THE DISCLOSURE

A constant voltage per cycle generator system comprises an alternating current generator, a generator field current regulator, and a sensing network connected from the generator output to the regulator input to provide a closed loop voltage regulated system. The generator possesses an approximately constant voltage per cycle output characteristic under conditions of constant magnitude field excitation. The field regulator is of the kind that can maintain a constant voltage output, independent of frequency, when the magnitude of generator output voltage is sensed at the regulator input. The sensing network that is provided from the generator output to the regulator input cooperates with these generator and regulator characteristics to restore the constant voltage per cycle characteristic of the generator to the system while retaining the voltage regulation feature for any output voltage variations caused by other than changes in frequency. In a particularly adaptable and economical embodiment of the invention, the sensing circuit of the system comprises a capacitive network, including a series capacitance and resistance connected in parallel with the generator output and means for applying a voltage to the input of the regulator that varies in magnitude in accord with variations in the magnitude of the voltage across the capacitance.

---

This invention relates to voltage regulated alternating-current power generation systems and, more particularly, pertains to systems of this kind that maintain a constant output voltage per cycle of generated voltage.

"Constant voltage per cycle" as used herein and in the appended claims means that the magnitude of the A-C voltage is directly proportional to the frequency of alternating current voltage cycles. For example, a constant voltage per cycle generator system providing a 100-volt output when producing 60-voltage cycles per second will have a 50-volt output when producing 30-voltage cycles per second. Reference herein to the magnitude of an A-C voltage indicates the effective, or RMS, magnitude integrated over a complete cycle.

Electric power generator systems characterized by a constant voltage per cycle output are advantageously used in a large number of applications. For example, such systems are well adapted for use with a prime mover of the internal combustion kind where it is desired to accelerate rapidly to rated speed and minimize the possibility of engine stalling or generator overheating. In addition, constant voltage per cycle systems are oftentimes used to power synchronous-reluctance motors used for winding threads of synthetic material under constant torque, variable speed conditions. Also, the usual induction motor acquires a substantially constant torque characteristic when energized by a constant voltage per cycle power source. The motor under these circumstances is frequently characterized in the art as having constant flux.

The usual alternating-current generator will provide an output which is approximately constant voltage per cycle under conditions of constant field excitation. This is readily apparent from the well-known electric generator equations. However, because of inherent secondary effects in electric generators, the voltage magnitude changes in response to variations in the magnitude of electric power supplied and other variables, whereas it is usually desirable, and sometimes required, to reduce or eliminate such dependence of the magnitude of output voltage. Thus, the problem to which the present invention is addressed primarily is providing an economical constant voltage per cycle generator system wherein the magnitude of output voltage varies with changes in frequency but is regulated to be independent of changes in other parameters. Preferably, a maximum number of the components of the system are readily available and have utility in other kinds of systems.

Accordingly, it is an object of this invention to provide an improved constant voltage per cycle generator system.

Another object of this invention is to provide an economical voltage regulated, constant voltage per cycle generator system.

Still another object of this invention is to provide a voltage regulated, constant voltage per cycle generator system featuring readily available commercial components.

Briefly, in accord with one aspect of this invention, a constant voltage per cycle generator system comprises an alternating current generator, a generator field current regulator, and a sensing network connected from the generator output to the regulator input to provide a closed loop voltage regulated system. The generator possesses an approximately constant voltage per cycle output characteristic under conditions of constant magnitude field excitation. The field regulator is of the kind that can maintain a constant voltage output, independent of frequency, when the magnitude of generator output voltage is sensed at the regulator input. The sensing network that is provided from the generator output to the regulator input cooperates with these generator and regulator characteristics to restore the constant voltage per cycle characteristic of the generator to the system while retaining the voltage regulation feature for any output voltage variations caused by other than changes in frequency. In a particularly adaptable and economical embodiment of the invention, the sensing circuit of the system comprises a capacitive network, including a series capacitance and resistance connected in parallel with the generator output and means for applying a voltage to the input of the regulator that varies in magnitude in accord with variations in the magnitude of the voltage across the capacitance.

While the specification concludes with claims particularly pointing out and distinctly claiming the subject matter of this invention, it is believed that the invention will be better understood from the following description taken in connection with the accompanying drawing wherein similar numerals designate corresponding components and in which:

FIGURE 1 is a schematic diagram depicting a single-phase power system including an illustrative embodiment of the invention; and FIGURE 2 is a partial schematic diagram illustrating application of the invention to a polyphase system that can otherwise be similar to the system of FIGURE 1.

The alternating-current generator system illustrated in FIGURE 1 includes a dynamoelectric generator 1 having an armature winding 2 and a field, or excitation, winding 3. Generator 1 can be any of a plurality of well-known kinds of alternating-current generators and possesses the usual approximately constant voltage per cycle output characteristic under conditions of constant magnitude excitation by field winding 3. This is to say that, under the latter condition, the voltage magnitude at armature output terminals 4 and 5 is directly proportional to the output frequency except for departures arising from usually secondary considerations as armature resistance and armature reaction, for examples. A principal objective of the present invention is to provide an economical system which retains this frequency dependent output characteristic while maintaining regulating capability with respect to non-frequency dependent changes of generator output voltage, as attributed to the aforementioned secondary considerations and others.

A prime mover 6, that can be an electric motor, internal combustion engine, or the like, is coupled to armature winding 2 by shaft 7. Rotation of armature winding 2 in the presence of excitation by field 3 provides generation of alternating-current electric power in the well-known manner at a frequency directly proportional to the angular velocity of rotation. Of course, a rotating field and stationary armature is the full equivalent for purposes of the present invention and is usually preferred in high power applications to obviate means for extracting primary power from the rotor.

A generator field excitation controller 8 is provided having output means, as output terminals 9 and 10, adapted to be coupled to field 3. The power source for controller 8 is omitted, for simplicity, but it is understood the generator can be either self or independently excited. Conductors 11 and 12 provide coupling of the controller output to field 3 in the illustration. A protective diode 13 is advantageously connected in parallel with field 3 to be conductive when the field is de-energized and the otherwise potentially injurious induced voltage is present. Diode 13 also performs as a free-wheeling diode in many applications.

Controller 8 has input means, including input terminals 14 and 15 (one of which is oftentimes directly connected to one of output terminals 9 and 10, respectively). The controller 8 can be any of a large number of such devices that are responsive to changes in the magnitude of a voltage applied to input terminals 14 and 15 to provide a change in the opposite direction in the magnitude of power supplied from output terminals 9 and 10. In the usual case the controller input means includes a reference voltage source establishing a preselected voltage level and it is the changes in input voltage magnitude from the preselected level to which the controller is so responsive. Controllers of this kind are most frequently employed to maintain a regulated constant voltage output by directly sensing the magnitude of generator output voltage. While, from the foregoing, it will be readily apparent to those skilled in the art which controllers are suitable as controller 8 in the system of FIGURE 1, a particularly advantageous controller for use in the present invention is disclosed and claimed in copending patent application Ser. No. 325,041, filed Nov. 20, 1963, for Voltage Regulator, and assigned to the assignee of the present invention.

In order to retain the constant voltage per cycle characteristic of the generator while using the above-described, readily available, constant voltage kind of controller, frequency dependent sensing means is employed that in a preferred and most economical embodiment of the invention comprises a series-connected resistance 16 and capacitance 17 coupled across generator output terminals 4 and 5. A voltage transformer is advantageously used to provide the coupling in unusually high voltage applications, but ordinarily resistance 16 and capacitance 17 are directly connected across terminals 4 and 5, as illustrated, by conductors 18 and 19. By selecting the relative circuit values for resistance 16 and capacitance 17, so that the resistive impedance is greater than about 3, and preferably 7 or more, times the capacitive impedance at the lowest desired frequency of generator output voltage, the frequency dependent sensing means is made to have a characteristic which is approximately the inverse of the generator's constant voltage per cycle characteristic. This is to say, with a constant magnitude voltage applied to the sensing means, the voltage across the capacitance varies inversely as variations in frequency. Thus, the sensing means essentially cancels the constant voltage per cycle characteristic of the generator.

The voltage across capacitance 17 is coupled to the input of controller 8 by a rectifying and averaging network advantageously selected to have an input impedance five or more times larger than the maximum impedance of capacitance 17 over the frequency range of interest to avoid undesirably affecting the sensing circuit. In FIGURE 1, the coupling means includes a diode 20, resistance 21, variably tapped resistance 22 and resistance 23 connected in series circuit relationship from the junction of resistance 16 to input terminal 15 of controller 8. A capacitance 24 shunts resistances 22 and 23 and the tap 25, of resistance 22, is connected to controller input terminal 14. In this way, a substantially direct-current voltage is applied to terminals 14 and 15 having a magnitude which is directly proportional to the magnitude of voltage across capacitance 17. The system control loop is thus closed, including a voltage regulator that is insensitive to generator output voltage changes resulting from frequency changes while maintaining regulating capability with respect to non-frequency dependent changes of generator output voltage.

The power utilization means for the system of FIGURE 1 is shown schematically as an induction motor 26 connected to output terminals 4 and 5 of generator 1. As mentioned before, motor 26 will be characterized by a desirable substantially constant torque, variable speed mechanical output from its rotor shaft. For more precise speed control, particularly when a plurality of motors are to rotate at the same speed, the motors are advantageously selected to be of the synchronous-reluctance kind.

The following table gives practical examples of component values that have been discovered experimentally to be suitable for use in the present invention. In the table, $f$ is the frequency in cycles per second, C is the capacitance of capacitor 17 in microfarads, $X_c$ is the impedance of capacitor 17 in ohms, R is the resistance of resistor 16 in ohms, and $E_g$ is the observed generator output voltage in volts:

TABLE

| $f$ | C | $X_c$ | | R | $E_g$ | |
|---|---|---|---|---|---|---|
| | | Min. $f$ | Max. $f$ | | Min. $f$ | Max. $f$ |
| 700–1,000 | .22 | 1K | 750 | 7.5K | 214 | 306 |
| 360–500 | .44 | 1K | 750 | 7.5K | 220 | 306 |
| 180–360 | .56 | 1.6K | 800 | 10K | 220 | 440 |
| 25–75 | 2.0 | 3.0K | 1K | 5K | 69.4 | 146 |

The shunt resistance across capacitance 17, comprising the summation of resistance values of resistances 21, 22 and 23, was in each of the above cases 10K ohms. Capacitance 24 was in the order of 1 microfarad.

In the first three examples, it can be seen that the capacitive impedance is less than one-third the resistance value of resistance 16 at the lowest frequency of operation. In each case essentially constant voltage per cycle is obtained. However, in the lowest frequency example, 25 to 75 cycles per second, the desired impedance relationship does not obtain and a departure from the essentially constant voltage per cycle characteristic is seen. In the example, frequency changes by a factor of three and voltage changes by little more than a factor of two. The example is given because in some cases only such an approximate constant voltage per cycle characteristic is required, as when engine stalling and generator overheating only are to be prevented under idling conditions. In such case, both economy of component cost and increased magnitude of voltage to controller 8 are effected by selecting an impedance ratio of about one or two.

FIGURE 2 illustrates schematically a polyphase embodiment of the invention. A polyphase generator 30 has an armature winding 31 and field 32. Field 32 is energized from controller 8, as was field 3 in FIGURE 1. The three-phase windings in the illustration are advantageously connected to a transformer 33 having a center-tapped, Y-connected secondary. Resistances 34, 35 and 36 and capacitances 37, 38 and 39 (one pair for each phase) correspond to resistance 16 and capacitance 17 in the single phase embodiment of FIGURE 1. Diodes 40, 41 and 42 connect the capacitances 37, 38 and 39, respectively, to one end of resistance 21. It will be apparent that the impedance ratios and component values discussed in connection with FIGURE 1 are the same for FIGURE 2, and the operation and result of the two circuits are equivalent. Accordingly, further explanation will be omitted in the interest of avoiding repetitiveness.

It should be pointed out, however, that in a particularly advantageous embodiment of this invention, an excitation control of the kind described in the aforementioned copending patent application is employed and all of the components in FIGURE 2, exclusive of armature 31 and the primary of transformer 33, are mounted on the generator rotor. In this case, the controller 8 advantageously receives power from the secondary of transformer 33, by means of a rectifier bridge (not shown), for example, as more particularly described in the above-referenced patent application.

This invention is not limited to the particular details of the embodiment illustrated, and it is contemplated that various modifications and applications will occur to those skilled in the art. For example, the generator described need not be a dynamoelectric machine but could equally well be a solid state inverter characterized by a substantially constant voltage per cycle output in response to constant input excitation. It is therefore intended that the appended claims cover such modifications as the foregoing and other applications as do not depart from the direct spirit and scope of this invention.

What we claim as new and desire to secure by Letters Patent of the United States is:

1. In an alternating-current electric generator system having an electric generator characterized by an approximately constant output voltage per cycle under conditions of constant magnitude excitation at the input thereof, the improvement of a voltage regulator for said system comprising:
    (a) a generator excitation controller including a reference voltage source establishing a preselected voltage level, output means adapted to be coupled to the generator input to provide excitation therefor, said controller responsive to departures from said preselected voltage level of a voltage applied to said controller to provide a compensating change in the magnitude of excitation supplied by said output means;
    (b) frequency dependent sensing means including a capacitance and resistance connected in series adapted for sensing the magnitude of output voltage of the generator; and
    (c) means coupling said capacitance in parallel with the input of said controller means so that the regulator is insensitive to generator output voltage changes resulting from frequency changes while maintaining regulating capability with respect to non-frequency dependent changes in the magnitude of generator output voltage.

2. The system of claim 1 wherein the impedance of said resistance is greater than the impedance of said capacitance throughout the normal operating frequency range of said system.

3. The system of claim 1 wherein the impedance of said resistance is more than three times larger than the impedance of said capacitance throughout the normal operating frequency range of said system.

4. The system of claim 2 wherein said means coupling said capacitance to said controller includes a diode and filter network providing a unidirectional voltage to said controller having a magnitude proportional to the magnitude of voltage present across said capacitance.

5. In an alternating-current electric generator system including a dynamoelectric generator having an armature winding and a field winding and possessing an approximately constant voltage per cycle characteristic under conditions of constant magnitude excitation of said field winding, a voltage regulator for said system comprising:
    (a) field excitation controller means including, a reference voltage source establishing a preselected voltage level, output means adapted to be coupled to the generator field winding, controller responsive to departures from said preselected voltage level of a voltage applied to said controller to provide a corresponding change in the opposite direction in the magnitude of field excitation;
    (b) frequency dependent sensing means including a capacitance and a resistance connected in series adapted for sensing the magnitude of alternating-current output voltage of the generator; and
    (c) means coupling said capacitance to said controller and providing a voltage at said controller that corresponds in magnitude to the magnitude of voltage across said capacitance so that the frequency dependent characteristic of said sensing means essentially cancels the constant voltage per cycle characteristic of the generator, whereby the regulator is insensitive to generator output voltage changes resulting from frequency changes while maintaining regulating capability with respect to non-frequency dependent changes of generator output voltage.

6. The system of claim 5 wherein said frequency dependent sensing means comprises a resistance and a capacitance connected in series relationship, said series relationship connected in parallel with a source of voltage having a magnitude proportional to the output voltage of said generator.

7. The system of claim 6 wherein the impedance of said resistance is greater than the impedance of said capacitance throughout the normal operating frequency range of said system.

8. The system of claim 6 wherein the impedance of said resistance is more than three times larger than the impedance of said capacitance throughout the normal operating frequency range of said system.

9. The system of claim 7 wherein said means coupling said capacitance to the input of said controller includes a diode and filter network providing a unidirectional voltage to said controller having a magnitude proportional to the magnitude of voltage present across said capacitance.

10. In a power system comprising an alternating-current generator having a rotor, a field winding and an armature winding; and, a prime mover connected to the rotor of said generator; the improvement comprising:
    (a) generator field regulator means coupled to the field of said generator and responsive to variations from a preselected level of the magnitude of a direct-current input signal to said regulator to provide a variation in the opposite direction of direct-current power applied to said field; and,
    (b) non-inductive sensing means coupled to the armature winding of said generator and to the input of said regulator, said sensing means comprising a resistance-capacitance network providing an alternating-current voltage across said capacitance having an effective magnitude that is inversely proportional to the frequency of voltage generated in said armature winding, means responsive to said A.C. voltage for providing a direct-current input to said regulator having a magnitude that is an essentially constant fraction of the effective magnitude of said alternating-current voltage, and means connecting said capacitance in parallel with the input of said regulator.

11. A power system comprising:
(a) an alternating-current generator having a rotor, a field winding and an armature winding;
(b) a prime mover connected to the rotor of said generator;
(c) an electric motor to exhibit constant torque coupled to and energized from said armature winding;
(d) generator field regulator means coupled to the field of said generator and responsive to variations in the magnitude of a direct-current input signal to said regulator to provide a variation in the opposite direction of direct-current power applied to said field; and,
(e) non-inductive sensing means coupled to the armature winding of said generator and to the input of said regulator, said sensing means comprising a resistance-capacitance network providing an alternating-current voltage across said capacitance having an effective magnitude that is proportional to the effective magnitude of voltage generated in said armature winding, said proportional relationship varying substantially inversely as variations in the frequency of generated voltage, and means connected across said capacitance for providing a direct-current input to said regulator having a magnitude that is a substantially constant fraction of the effective magnitude of said alternating-current voltage across said capacitance.

12. A power system comprising:
(a) an alternating current generator having a rotor, a field winding and an armature winding, said generator being characterized by a constant volts per cycle output in response to constant magnitude field excitation;
(b) generator field regulator means coupled to the field of said generator and responsive to variations from a preselected level of the magnitude of a direct-current input signal to said regulator to provide a variation in the opposite direction of direct-current power applied to said field; and
(c) non-inductive sensing means coupled to the armature winding of said generator and to the input of said regulator, said sensing means comprising a resistance-capacitance network having a resistive impedance greater than the capacitive impedance and providing across said capacitance an alternating-current voltage having an effective magnitude that is proportional to the effective magnitude of voltage generated in said armature winding, said proportional relationship varying substantially inversely as variations in the frequency of generated voltage, rectifier means connected to said capacitance for providing a direct-current input to said regulator having a magnitude that is an essentially constant fraction of the effective magnitude of said alternating-current voltage across said capacitance, and means connecting said capacitance in parallel with the input of said regulator.

References Cited
UNITED STATES PATENTS 2,725,518  11/1955  Sueker _____ 322—28
3,121,836  2/1964  Rosenberry _____ 322—24

ORIS L. RADER, *Primary Examiner.*

K. L. CROSSON, *Assistant Examiner.*

U.S. Cl. X.R.

318—20.435, 147, 158; 322—32